[72] Inventors Julio Zumeta
New York, New York;
Edward M. Case, Weston, Connecticut
[21] Appl. No. 672,354
[22] Filed Oct. 2, 1967
[45] Patented Oct. 20, 1970
[73] Assignee The Marlo Company Inc.
New York, New York

[54] BRAIDED HIGH-TEMPERATURE PACKING
8 Claims, 3 Drawing Figs.
[52] U.S. Cl............................................. 87/1,
57/149, 117/124, 161/175, 277/230
[51] Int. Cl........................................ D04c 1/02,
D04c 1/06
[50] Field of Search............................. 87/1, 6, 7,
8; 57/149, 150, 153, 154, 162, 164, 165; 277/229,
230, 233; 117/70, 98, 124, 126, 140, 71, 160;
156/148, 149; 161/169, 170, 175, 176

[56] References Cited
UNITED STATES PATENTS
| | | | |
|---|---|---|---|
| 2,667,804 | 2/1954 | Boyer et al. | 277/230X |
| 2,905,574 | 9/1959 | Spengler et al. | 117/126UX |
| 3,306,155 | 2/1967 | Zumeta et al. | 57/153X |
| 3,361,432 | 1/1968 | Usher | 277/229X |
| 3,403,595 | 10/1968 | Watson | 87/1 |

*Primary Examiner*—Robert F. Burnett
*Assistant Examiner*—William A. Powell
*Attorney*—Blum, Moscovitz, Friedman, Blum and Kaplan ABSTRACT: This invention relates to high-temperature packing materials, and more particularly to packing materials which are capable of withstanding high temperatures in mechanical operations, such as in pumps and the like and which are resilient while having a low coefficient of friction. The packing may be formed of a braided core of glass or silicon dioxide filaments impregnated with molybdenum disulfide and the core may be provided with a surface coating of molybdenum disulfide and/or a braided graphite jacket.

BRAIDED GLASS FILAMENTS IMPREGNATED WITH MOLYBDENUM DISULFIDE

Lubricant

Patented Oct. 20, 1970

3,534,652

BRAIDED GLASS FILAMENTS IMPREGNATED WITH MOLYBDENUM DISULFIDE

COATING OF MOLYBDENUM DISULFIDE

FIBER GLASS CORE IMPREGNATED WITH MOLYBDENUM DISULFIDE

BRAIDED GRAPHITE JACKET

FIBER GLASS CORE IMPREGNATED WITH MOLYBDENUM

INVENTORS.
JULIO ZUMETA
EDWARD M. CASE

BY

ATTORNEYS

BRAIDED HIGH-TEMPERATURE PACKING

BACKGROUND OF THE INVENTION

The production of an efficient packing material for operation and high temperatures (from 800°F. to 2,000°F.) has presented numerous problems. Packing materials of essentially metallic construction in several different arrangements, and graphite arrangements with or without asbestos have been used until now.

A very common and widely used high temperature packing consists of aluminum foil crinkled, twisted and calendered to a square cross section. This packing material has the disadvantage that the body of the packing is by its very nature porous and must be very tightly compressed in order to prevent the sealed fluids from passing through the body of the packing. A further disadvantage of aluminum as a packing material is the fact that although the metal is soft at its higher temperature rating, in the neighborhood of about 1,000 °F., it is stiff and scratchy at ambient temperature. Consequently, where a wide range of temperature ratings, from ambient to 1,000°F., are required, particularly in packing rotating shafts, this type of packing is not satisfactory because it is abrasive in the low temperature range.

A variation of this aluminum construction utilizes a core of white asbestos, either twisted or braided, either dry or impregnated with a microcrystalline wax or liquid hydrocarbon as a lubricant. The core assists in reducing the porosity of the body of the packing. However, the asbestos and its cotton content are vulnerable to high temperatures, the cotton carbonizing well below 1,200°F. and being significantly affected at temperatures as low as 200°F., thus materially weakening the core structure. Even the asbestos will break down at below 1,000°F. Moreover, the hydrocarbon lubricants will generally be burned off at the high temperatures of use of the packing.

Attempts have also been made to solve the problem by providing braided structures with metallic wires of, for example, inconel, copper or other metals, which in themselves are resistant to high temperatures. Though the metals may themselves be resistant to high temperatures, this attempt to solve the problem has not been successful because the braided construction using these metal wires is inherently porous, and in addition, most metals that are resistant to high temperatures have a high coefficient of friction which makes them undesirable as packing materials for use in contact with a moving shaft. Various metals have been used to try to reduce these disadvantages, such as braided combinations of metal and asbestos with or without powered graphite impregnation. However, asbestos itself has disadvantages as mentioned above.

More recently high temperature braided packings have been made using carbon filaments. These filaments are, however, quite weak so that the packing is limp and does not have the desired packing quality of compressibility and recovery (springiness) that is required of a material for packing purposes. Additionally, packing of this type are extremely expensive.

SUMMARY OF THE INVENTION

Generally speaking, in accordance with the invention, a packing material is made of braided glass or silicon dioxide (quartz) filaments or fibers which are impregnated with molybdenum disulfide. The molybdenum disulfide acts in the dual capacity of a sealant of the interstices between the glass filaments, and as a high grade lubricant against a moving surface. Glass filaments are used for packing materials with a temperature rating of up to about 1,200°F., and quartz filaments or fibers are used for packing materials having a temperature rating above 1,200°F. and as high as 2,000°F.

Accordingly, it is an object of the present invention to provide a packing material which can be used for high temperature packings and which has all of the required properties of resistance to high temperatures, compressibility, recovery and low coefficient of friction.

It is another object of the present invention to provide packing materials of dimensional stability, chemical resistance, low coefficient of friction and usefulness over a large rated temperature range.

It is yet a further object of the present invention to provide a packing material that can be easily cut and formed into rings and that will not mat together to form a hard, unyielding mass under the influence of heat and pressure.

Other objects and advantages of the present invention will be apparent from a further reading of the specification and of the appended claims.

BRIEF DESCRIPTION OF THE DRAWINGS

For full understanding of the invention, reference is had to the following description taken in connection with the accompanying drawings, in which.

DESCRIPTION OF PREFERRED EMBODIMENTS

In the description of the accompanying drawings herein reference is had to braided glass filaments which are impregnated with molybdenum disulfide. It is to be understood, however, that in all of the illustrations braided silicon dioxide or quartz filaments or fibers can be used in the place of the glass filaments or fibers. Glass is used for packing materials having a temperature rating of 800°—1,200°F., whereas silicon dioxide or quartz fibers are used where the temperature rating of the packing is above 1,200°F. and up to 2,000°F.

Figure 1:
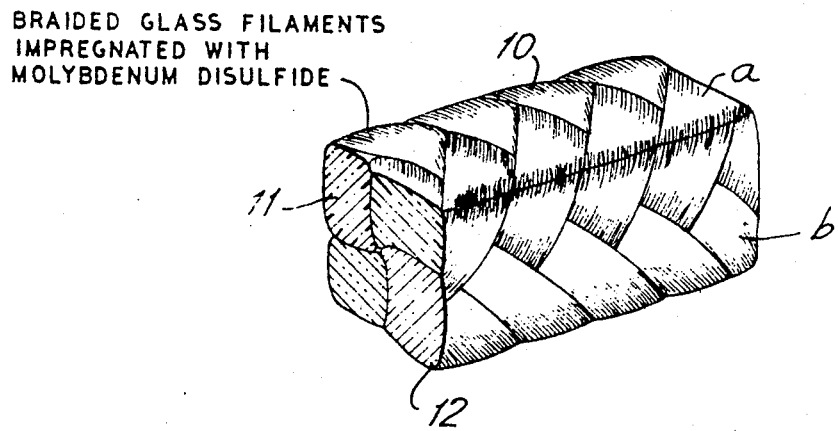
FIG. 1 illustrates a packing structure wherein braided glass filaments or fibers are impregnated with molybdenum disulfide.

Referring now to FIG. 1, the basic packing structure 10 of the present invention consists of braided long glass fibers 11 impregnated with molybdenum disulfide particles which enter the interstices between the fibers and also surround the fibers. The glass fiber braids a and b can be formed by any variety of conventional techniques. One preferred method of formation consists in first twisting the individual relatively long glass fibers to form a braiding rope and then to overlap it with other twisted fibers to form a braided structure. Another procedure consists in taking individually twisted glass fibers and making a twisted bundle of a number of the fibers and utilizing the twisted bundle in the formation of a braids a or b. In still another embodiment, individual fibers or a bundle of fibers may first be impregnated prior to braiding and the braids then further impregnated.

After making of the braided structure, the same is then impregnated with molybdenum disulfide, generally by the use of a suspension of molybdenum disulfide, the braided structure being passed through a bath of the same.

Figure 2:
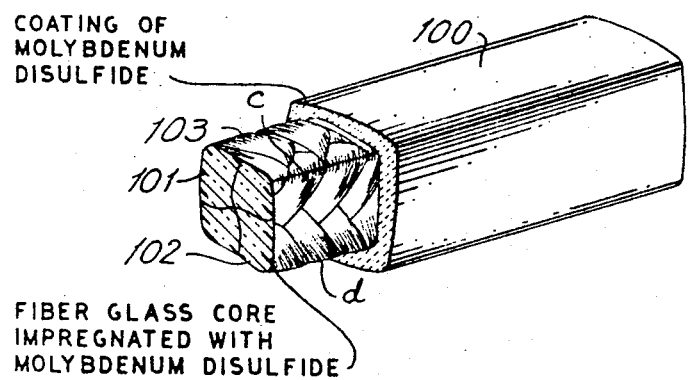
FIG. 2 illustrates a structure wherein braided glass fibers or filaments are impregnated with molybdenum disulfide and provided with a coating of molybdenum disulfide.

In the embodiment of FIG. 2, the packing structure 100 is shown consisting of a braided glass fiber core 103 of braided fiber glass 101 impregnated with molybdenum disulfide particles 102, letters c and d designating the braided glass fiber structure, the entire core being coated with a molybdenum disulfide coating 104. This coating is formed by air drying the packing structure of FIG. 1 which is obtained by passing the braided glass fibers through a molybdenum disulfide suspension and then air drying the strands at ambient temperature, and immersing the thus obtained braided packing in a bath of molybdenum disulfide suspension and air drying and calendering the resulting packing structure.

Any of the conventional types of braids, e.g. twisted, square, interlocking, braid-over-braid, etc. can be employed, utilizing conventional techniques for forming the same, such as described in the handbook of Mechanical Packings and Gasket Material, 1960 (Library of Congress Catalogue 60-16524) issued by the Mechanical Packing Association, 17 John Street, New York, New York.

Figure 3:
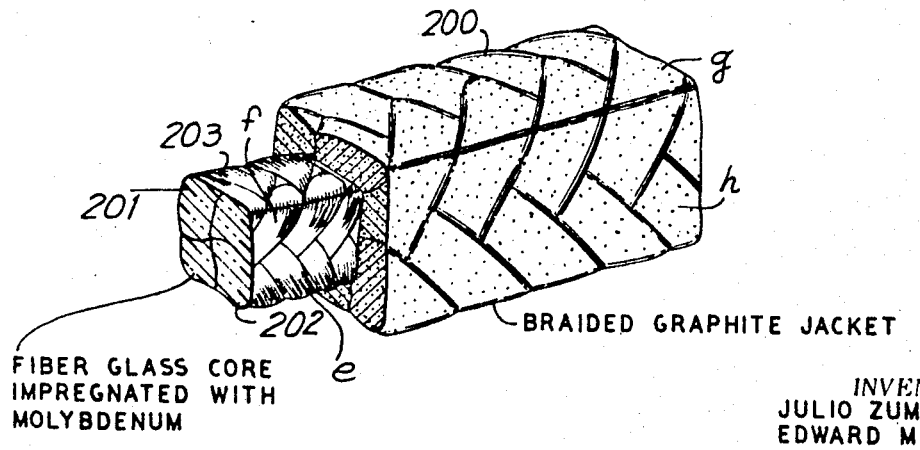
FIG. 3 illustrates a structure wherein a braided glass fiber core impregnated with molybdenum disulfide is used in combination with a braided graphite jacket.

Any convenient molybdenum disulfide suspension may be used. A commercially available suspension is known as Dixon Suspension M-46 obtained from the Joseph Dixon Crucible Company, Jersey City, New Jersey. This is a fast-drying, greaseless composition containing 31 percent solids, molybdenum disulfide suspended in an alcoholic vehicle. For impregnation of the braided structure, the material received from the manufacturer is diluted with an alcohol such as isopropanol. FIG. 3 illustrates a packing material having the surface characteristics of a braided carbon filament, particularly a graphite filament packing, while retaining the superior mechanical properties of the packing of the present invention, namely a dense, but resilient and springy body. As shown in FIG. 3, a packing 200 comprises graphite filament braids g and h surrounding the basic braided glass fiber core 203 consisting of braided fiber glass 201 impregnated with molybdenum disulfide particles 202, letters e and f designating the braided glass fibers structure. Braids g and h can be a carbon filament, most advantageously in graphitic form since such graphite filaments are stronger than filaments of carbon in any other form. The braided graphite jacket is formed of graphite filaments, such as graphite yarn GY-2-10 (high twist), available from The Carborundum Company, Sanborn, New York. Other suitable carbon filaments may be used.

The following examples are given to further illustrate the present invention. The scope of the invention is not, however, meant to be limited by the specific details of the examples.

EXAMPLE 1

Glass fibers having 4.0 twists per inch with an average filament diameter of about 0.000275 inch, a length of approximately 12 inches, and the following approximate composition:

| Ingredient: | Weight percent |
| --- | --- |
| Silicon dioxide | 55 |
| Aluminum oxide | 6 |
| Boron oxide | 7 |
| Sodium potassium oxide | 12 |
| Mixture of magnesium oxide and calcium oxide | 20 |

Glass fibers of the above description are available from Owens Corning Fiberglass, designated, CSE 12.5/1 4Z.

The following describes the construction of ¼ inch square packing: Eleven fibers of the type described above are taken together and twisted approximately six turns per foot. The thus formed strands are run through a bath of molybdenum disulfide suspension (Dixon Suspension M-46) diluted with isopropanol in a volume ratio of 1 : 1. Ethyl alcohol may be used as diluent instead of isopropanol. The strands are run through the bath at a rate of approximately 60 feet per minute. The strands are air-dried at ambient temperature for about 8 hours and then loaded on the bobbins of an 8 Carrier Square Braider. Using one strand as a center, the ¼ inch packing is braided.

The braided packing is then immersed in the same molybdenum disulfide suspension for approximately 2 to 3 minutes and thereafter air-dried and calendered to final shape. This final immersion and drying step results in the formation of a molybdenum disulfide coating on the braided packing. The final product contains approximately 89 percent glass fibers and 11 percent molybdenum disulfide.

EXAMPLE 2

This describes the manufacture of a ¾ inch packing. A ¼ inch core of the glass fibers described in Example 1 above is made by taking eleven glass fibers together and twisting them approximately six turns per foot. The thus formed strands are loaded on the bobbins of a 8 carrier braider, and using an additional strand as a center, a ¼ inch dry, square braided glass fiber core is constructed by the normal operation of the braider.

The thus formed core is immersed in the above described molybdenum disulfide suspension and the container including the glass fiber core is placed in the center of and beneath a 20 carrier braider. The bobbins of the braider are loaded with strands of glass fibers consisting of 6 fibers as previously described, and twisted. A jacket is formed by the braider around the wet core as it emerges from a molybdenum disulfide bath. The normal compressive effect of the jacket braiding operation forces the liquid suspension into the interstices of the fibers in the core and out through the fibers of the jacket. The product so formed is calendered to ⅜ inch square. The ⅜ inch core thus formed is again immersed in the molybdenum disulfide suspension described above the 20 carrier braider, and by repetition of the previous operation (braiding a jacket around) the size is increased to ½ inch. A third jacket brings the size to 5/8 inch, and a fourth to ¾ inch square. In each case the jacket is formed around a wet core, drawn out of the suspension by the action of the braider. Each size is calendered square, in the damp state, prior to being used as the core for the next larger size.

The final ¾ inch square product is immersed in the suspension for approximately 2 minutes, withdrawn and allowed to air-dry at ambient temperature for about 12 hours. The dry product then receives a final calendering to ¾ inch square size. The final product contains approximately 11 percent by weight molybdenum disulfide and 89 percent glass fibers.

Though the packing as described above may be used to pack rotating or reciprocating elements of pumps, compressors, or valves, or as a seal or gasket on furnace doors and the like, it may sometimes be desirable to include a starting lubricant to reduce the packing and break-in period, especially when high surface rubbing speeds are involved. Initial lubricants (transient at the higher temperatures) will decompose after they have served their purpose. Depending on the intended application of the packing, these may be high temperature petroleum base greases, silicone greases, Teflon, and others.

The packing of the present invention is characterized by a highly resilient body, very desirable in mechanical packing, because it is essentially composed of a large number of intertwined long-pitched helical springs formed in the twisting operation. The molybdenum disulfide is thermally stable from −350° to 750°F. in air, and in the absence of air such as in a closed stuffing box or as confined when used as valve stem packing, at much higher temperatures. Using glass fibers as the core, the packing material can be used at temperatures up to 1,200°F. For packing requiring a temperature range between 1,200°F. and 200°F., silicon dioxide fibers may be used for the body of the packing since these fibers are capable of extended exposure to 2,000°F. temperatures, and molybdenum disulfide is stable at this temperature in the absence of air. Thus, in the two examples described above, and in the general description given above, the substitution of quartz fibers for the glass fibers described will result in the obtaining of packing material of the same mechanical structure with temperature ratings of from 1,200°F. to 2,000°F. due to the quartz fibers being used instead of glass fibers.

It should further be noted that even the oxidation byproduct of molybdenum disulfide, namely molybdenum trioxide, although not a good antiwear lubricant, is nevertheless a useful antiseize material.

Where a packing is desired having the surface characteristics of a braided all carbon filament packing, while retaining the superior mechanical properties of the instant packing, a final jacket or carbon filament in graphite form may be braided around the core described above.

The following are advantageous characteristics of the packings produced according to the present invention:

1. The packing is high temperature resistant (up to 1,200°F. using glass fibers and up to 200°F. using silicon dioxide fibers) while having a high degree of resilience, dimensional stability (after the breaking-in period), chemical resistance, and coefficient of friction over the rated temperature range.
2. The packings are resilient and springy to a degree far greater than high temperature packings produced prior to this invention.
3. The packings can be formed into dense bodies because of the small diameter of the glass filaments and the filling of the interstices of the packing by the molybdenum disulfide.
4. The packing surface has a very low coefficient of friction, which is a highly desirable characteristic when being used against a moving surface.
5. The packings have considerable chemical stability because very few substances can attack either the molybdenum disulfide or the glass or quartz fibers.
6. The packings of the invention are very easy to cut and form into rings, much more so than packings that include in their construction wires of copper, inconnel or other high temperature metals.
7. The packings do not mat together to form a hard, unyielding mass under the influence of heat and pressure, such as is the case with packings made of metal, foils, aluminum and copper.

It is apparent that certain changes may be made in the constructions described above without departing from the spirit or scope of the invention. It is therefore intended that matter contained in the above description or shown in the accompanying drawings shall be interpreted as illustrative and not in a limiting sense.

Thus, all variations and modifications of the invention which do not depart from the spirit or scope thereof are meant to be comprehended within the meaning and scope of equivalents of the appended claims.

We claim:
1. A packing material, comprising a core body formed of braided filaments of a material selected from the group consisting of glass filaments and silicon dioxide filaments, and molybdenum disulfide filling and sealing the interstices between said filaments.
2. Packing material according to claim 1 having a temperature rating up to about 1,200°F. and wherein the filaments are glass filaments.
3. Packing material according to claim 1 having a temperature rating up to about 2,000°F. and wherein the filaments are silicon dioxide filaments.
4. Packing material according to claim 1 wherein each of said filaments continuously extends from one end of said core to the opposite end of said core.
5. The article of claim 1, which is coated with molybdenum disulfide.
6. The article of claim 5 which is encased in a jacket of braided carbon.
7. The article of claim 1 which is encased in a jacket of braided carbon.
8. The article of claim 7 wherein the carbon is graphite.